(12) United States Patent
Mitsuda et al.

(10) Patent No.: US 6,193,176 B1
(45) Date of Patent: Feb. 27, 2001

(54) CEMENT CLINKER GRINDING METHOD USING VERTICAL ROLLER MILL AND APPARATUS

(75) Inventors: Yoshihiro Mitsuda, Kakogawa; Seisuke Sawamura, Akashi; Hiroshi Ueda; Fuminori Ando, both of Kobe; Kanzaburo Sutoh, Kodama-gun; Mitsuaki Murata, Kumagaya; Akihiko Takayama, Ofunato, all of (JP)

(73) Assignees: Kawasaki Jukogyo Kabushiki Kaisha, Kobe; Taiheiyo Cement Corporation, Tokyo, both of (JP)

( * ) Notice: Subject to any disclaimer, the term of this patent is extended or adjusted under 35 U.S.C. 154(b) by 0 days.

(21) Appl. No.: 09/020,417

(22) Filed: Feb. 9, 1998

(30) Foreign Application Priority Data

Feb. 18, 1997 (JP) ...................................... 9-033617
Feb. 18, 1997 (JP) ...................................... 9-033618

(51) Int. Cl.$^7$ ...................................... B02C 19/12
(52) U.S. Cl. .............................. 241/21; 241/24.1; 241/80
(58) Field of Search .............................. 241/15, 21, 24.1, 241/27, 41, 79.2, 117, 121, 80; 239/597, 598, 601

(56) References Cited

U.S. PATENT DOCUMENTS

| 2,076,288 | 4/1937 | Bailey et al. ............................. 83/45 |
| 4,097,000 | * 6/1978 | Derr ..................................... 239/599 |
| 4,385,730 | * 5/1983 | Kartmen ........................... 241/117 X |
| 4,754,932 | * 7/1988 | Kmiotek ........................... 241/121 X |

(List continued on next page.)

FOREIGN PATENT DOCUMENTS

142426 * 6/1990 (DE) .
112022 * 11/1983 (EP) .
352192 * 1/1990 (EP) .
513770 * 5/1992 (EP) .

(List continued on next page.)

OTHER PUBLICATIONS

Feige, F., "Die Wälzmühle—Technischer Stand und Entwicklungsmöglichkeiten," ZKG International, vol. 46, No. 8, Aug. 1, 1993, pp. 451–456.

Becker, J.F., "Die grösste und die kleinste Wälzmühle," ZKG International, vol. 47, No. 12, Dec. 1, 1994, pp. 718–723.

Primary Examiner—Mark Rosenbaum
(74) Attorney, Agent, or Firm—Oliff & Berridge, PLC

(57) ABSTRACT

A method of grinding cement clinkers and a cement clinker grinding apparatus having a vertical roller mill are provided. In the method, feed material is ground by a table and rollers. Next, substantially all the resultant ground material is taken out from an underside of the table and then converted to a separator for classifying the ground material by a bucket elevator. The resultant coarse powder provided by the separator is returned to a center of the table. In grinding, an pressing force of each of the rollers onto the table is selected so that a roller pressure per full sectional area of the roller ranges from 10 to 15 kg/cm$^2$. Further, a circulation quantity of the coarse powder to be returned to the vertical roller mill is selected from 100 to 300% of the feed material charged into the center of the table. And the liquid of 0.5 to 3% of the feed material to be ground such as water alone or a mixture of water and diethylene glycol is sprayed on the only frictional grinding zone which is positioned outside a position where a relative speed between said table and each of said rollers is equal to zero, in the radial direction of said table. By spraying the liquid on the only frictional grinding zone, the materials are involved firmly between the table and the roller to form the layer of the ground materials, so that the vibration of the roller and table are restrained

4 Claims, 14 Drawing Sheets

U.S. PATENT DOCUMENTS

| | | | | |
|---|---|---|---|---|
| 4,828,189 | * | 5/1989 | Schonbach | 241/121 |
| 4,981,269 | * | 1/1991 | Koga et al. | 241/121 X |
| 5,221,051 | * | 6/1993 | Hashimoto | 241/152.2 |
| 5,251,831 | * | 10/1993 | Yoshida et al. | 241/117 X |
| 5,580,002 | * | 12/1996 | Ward et al. | 241/117 |

FOREIGN PATENT DOCUMENTS

| | | |
|---|---|---|
| 0 486 371 A2 | 5/1992 | (EP) . |
| 0 513 770 A2 | 11/1992 | (EP) . |
| 0 801 987 A2 | 10/1997 | (EP) . |
| 2 337 587 | 8/1977 | (FR) . |
| 63-159241 | 7/1988 | (JP) . |
| 7-64603 | 7/1988 | (JP) . |
| 7-204528 | 8/1995 | (JP) . |
| 7204528 * | 8/1995 | (JP) . |

* cited by examiner

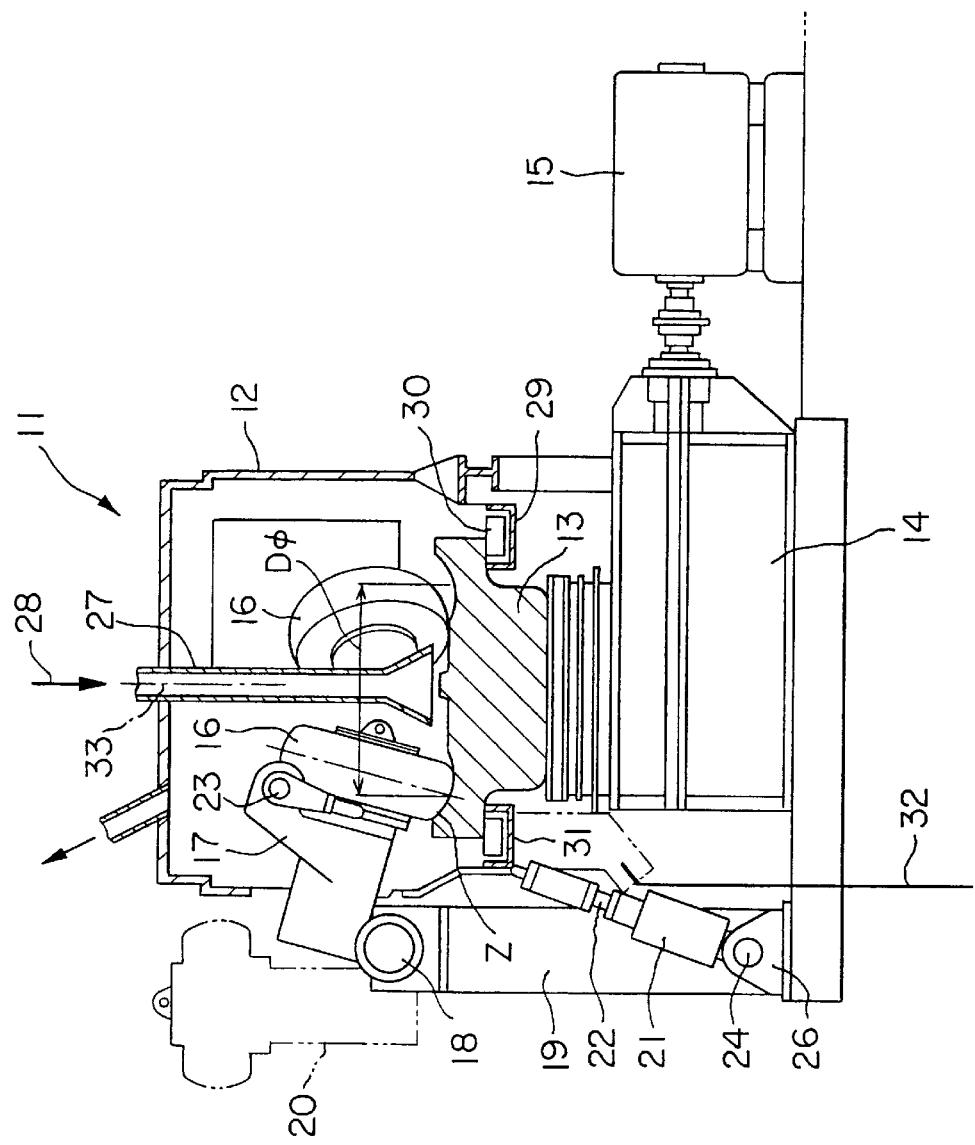
F I G. 2

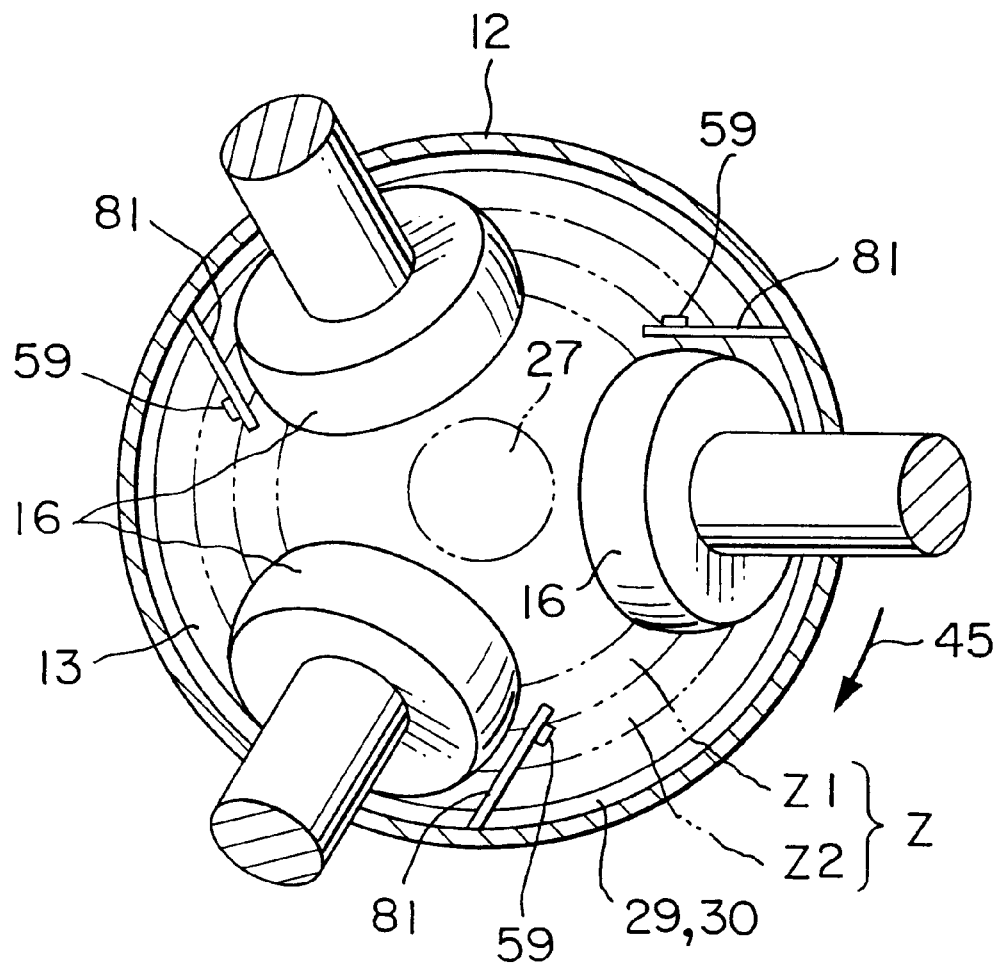
F I G. 3

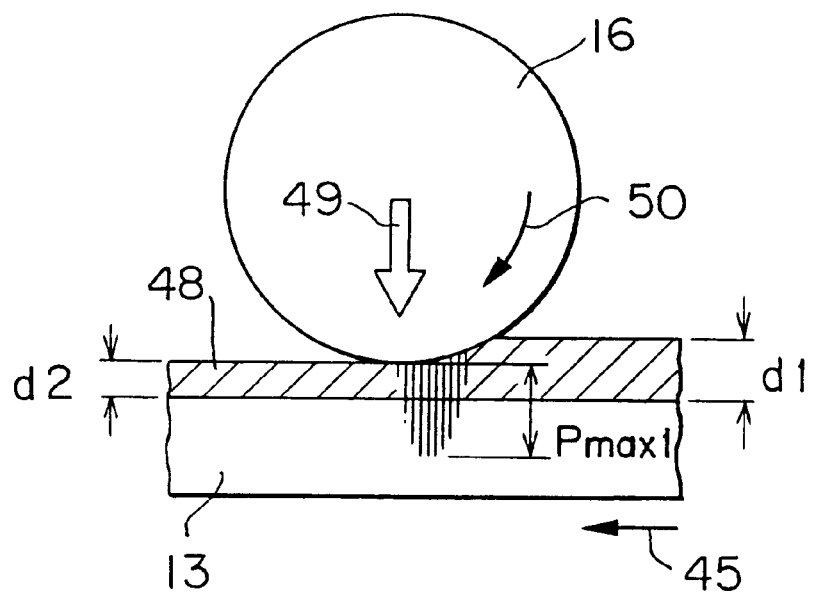
F I G. 4A
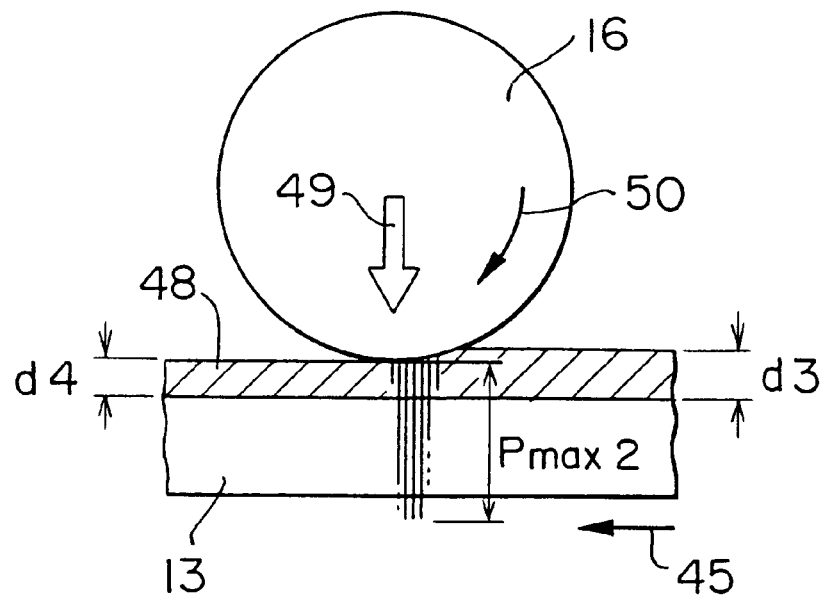
F I G. 4B

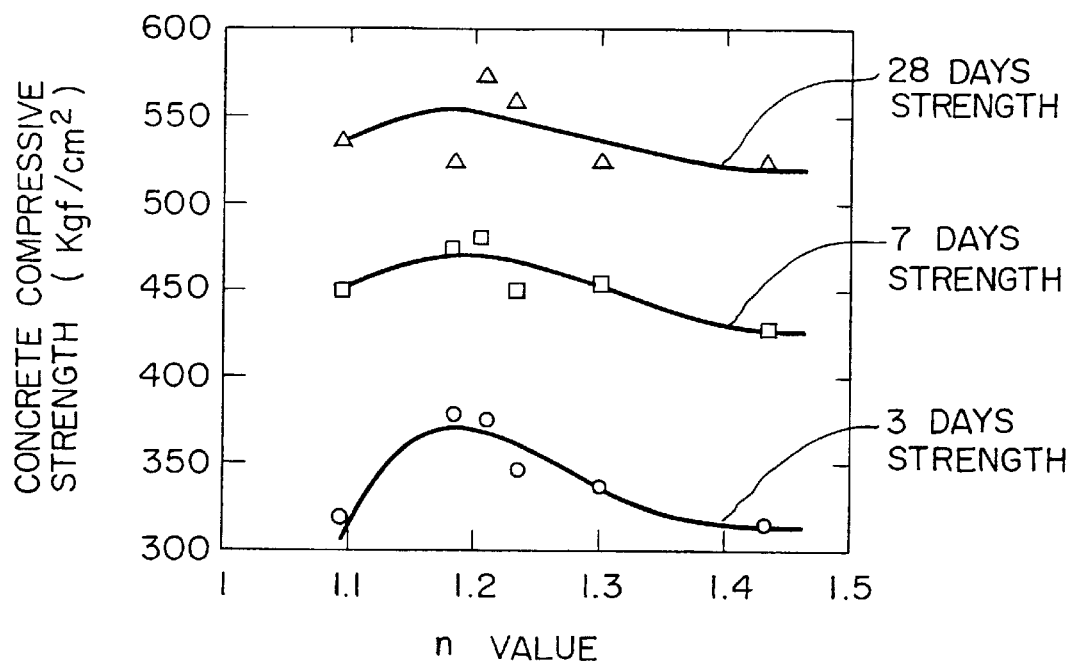
F I G. 10
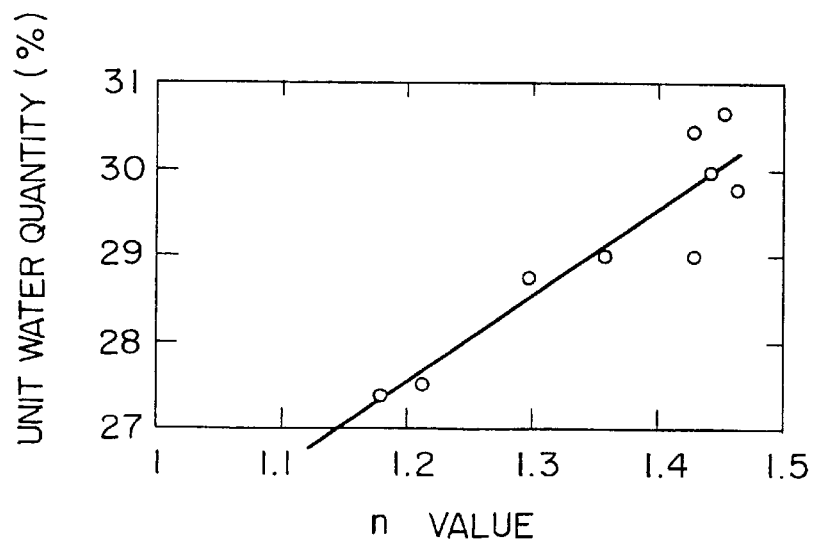
F I G. 11

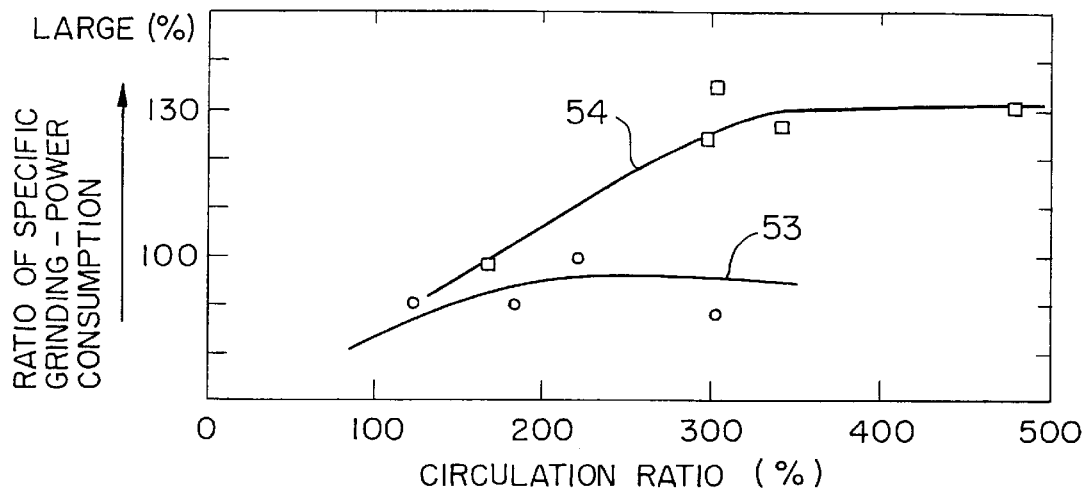
F I G. 12
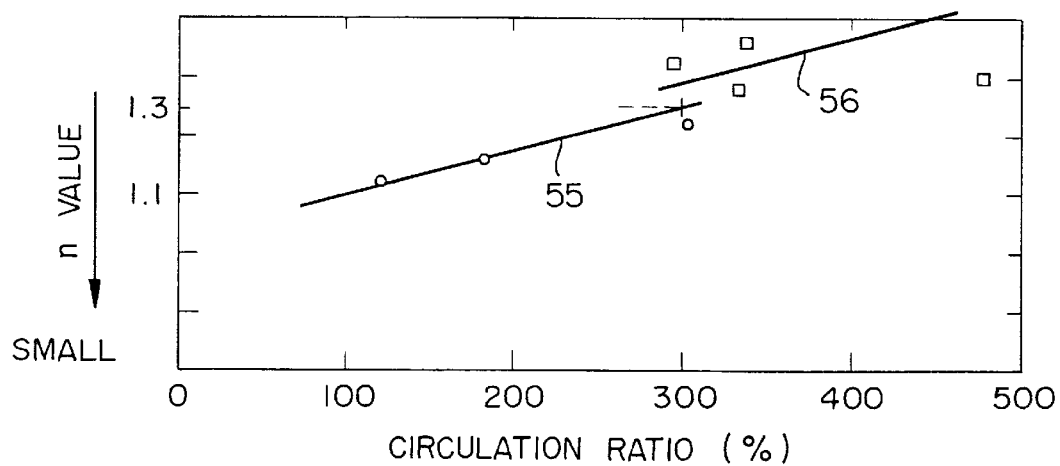
F I G. 13

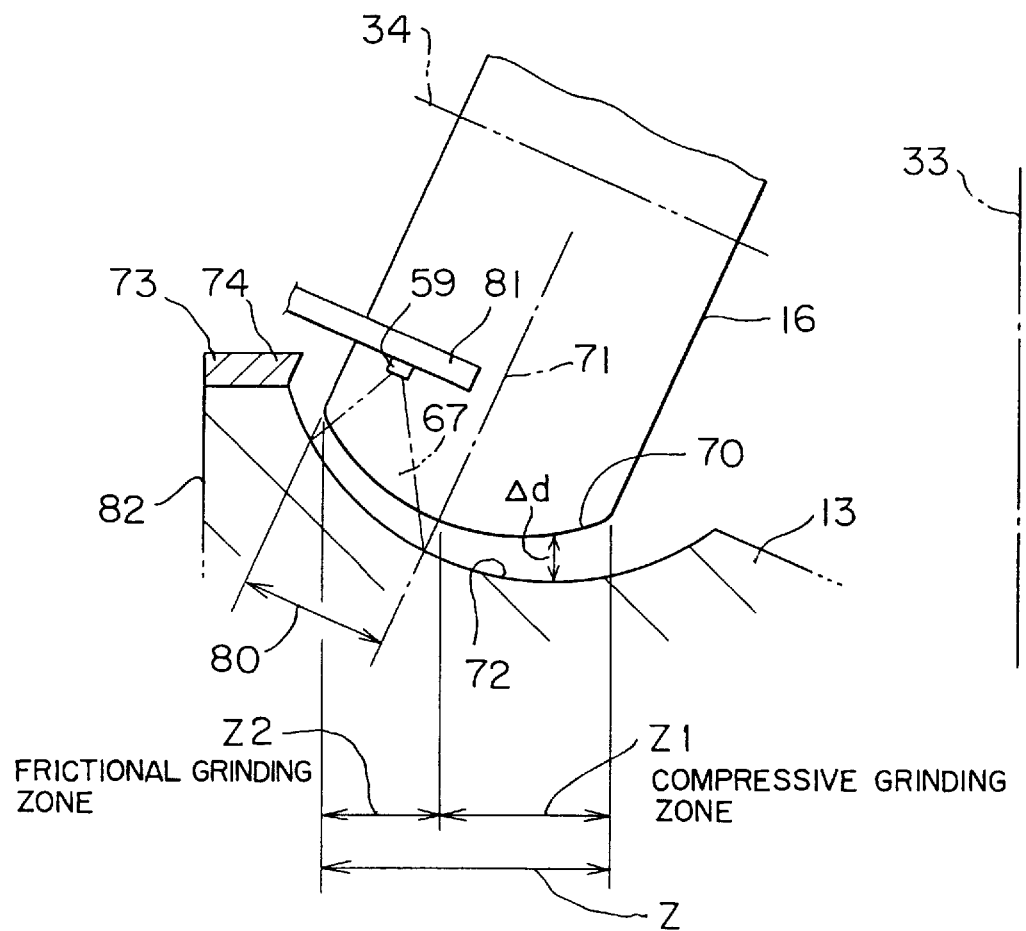
F I G. 18A
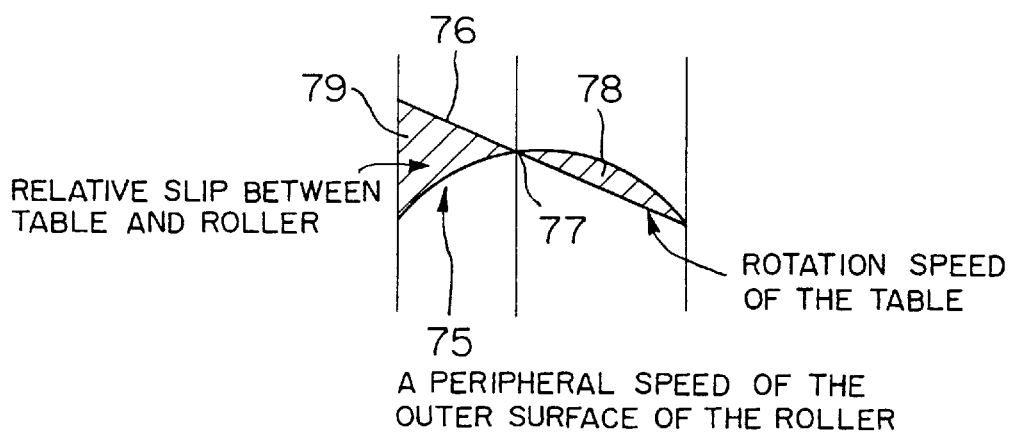
F I G. 18B

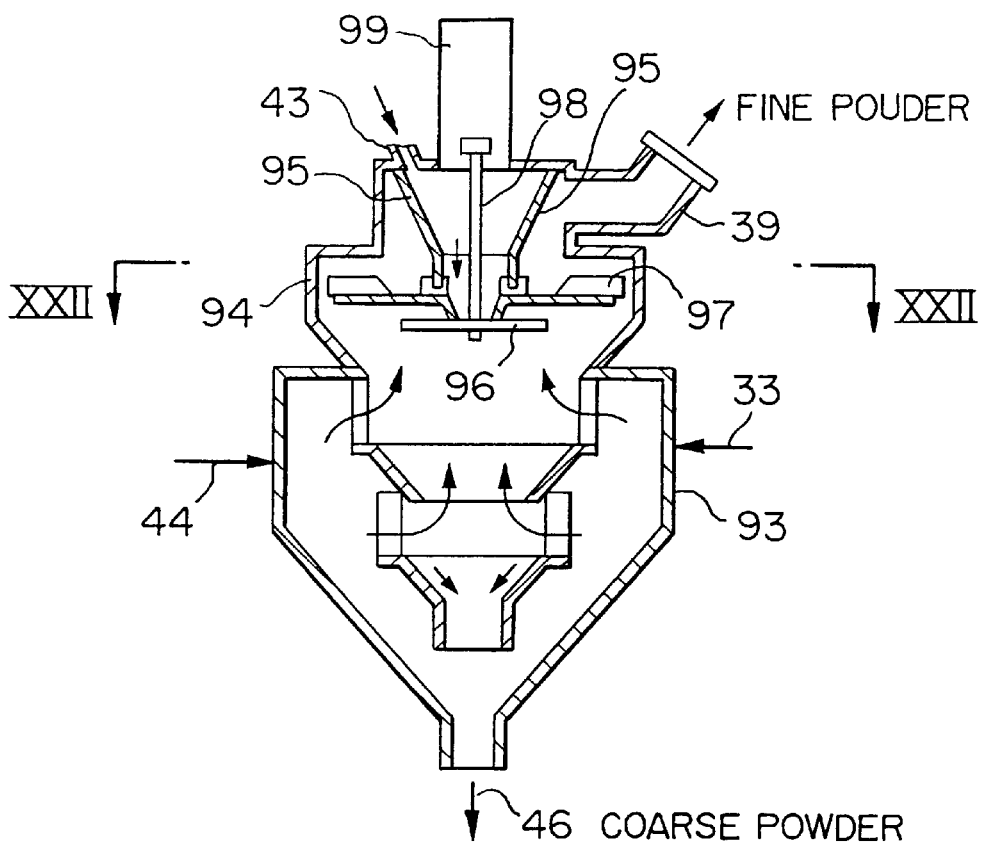
F I G. 21
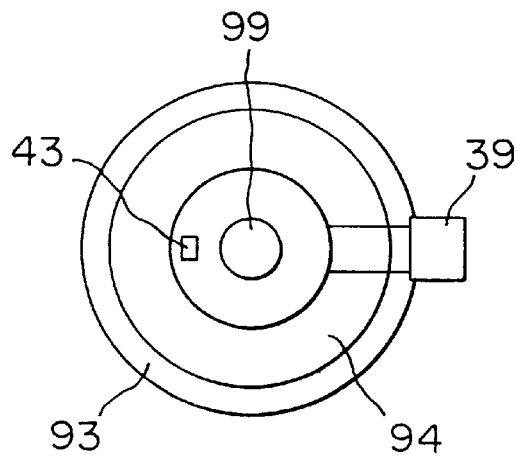
F I G. 22
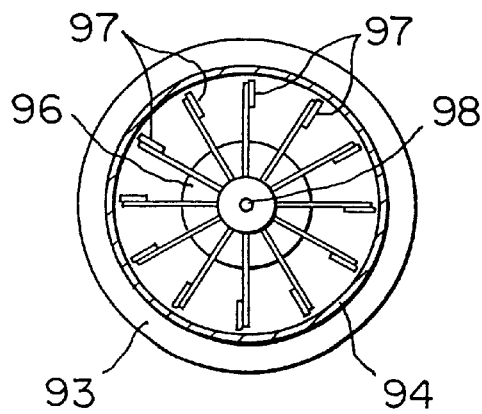
F I G. 23

CEMENT CLINKER GRINDING METHOD USING VERTICAL ROLLER MILL AND APPARATUS

BACKGROUND OF THE INVENTION

The present invention relates to a cement clinker grinding method using a vertical roller mill and a cement clinker grinding apparatus, by which cement clinkers and cement materials are ground and produced as cement products by use of the vertical roller mill.

FIG. 24 shows a prior art vertical roller mill which has been used for producing the cement products by grinding the cement clinkers, the cement materials and so on. In FIG. 24, a vertical roller mill 1 of so-called separator built-in type includes a housing 2, a table 3 arranged in the housing 2 so as to rotate about a vertical axis and a motor 4 for rotating the table 3. A plurality of rollers 5 are pressed on the table 3. In the housing 2, a separator 6 is arranged above the table 3 and the rollers 5. Feed material to be ground, which has been supplied from a material chute 7, is ground between the table 3 and the rollers 5. Air is introduced into a clearance 8 defined between an outer periphery of the table 3 and an inner periphery of the housing 2 in order to blow up the ground material by a resultant air flow 9. The ground material blown up is classified in the separator 6, so that the fine powder as the products is conveyed by air flow through a pipe line 10. As shown with an arrow 11, the coarse powder is returned onto the table 3 for circulation and ground thereon again.

In the above-mentioned vertical roller mill 1 of FIG. 24, the pressure of the roller 5 per full sectional area of roller is established to be less than about 8 kg/cm$^2$. Such an establishment of the roller pressure allows the resultant products to have a particle size suitable for the cement and makes a basic unit of power satisfactory.

Further more, in the prior art vertical roller mill 1, a circulation ratio of the ground material (alias, a ratio of grinding occasion, that is, a ratio of a flowing amount of the coarse powder returned from the separator 6 onto the table 3 to a flowing amount of feed material charged into the vertical roller mill through the material chute 7) is estimated more than 1000 per cent (%), so that the coarse powder is instantly returned onto the table 3 for grinding it again. Thus, as an example, in order to realize the grinding amount of 100 ton/hour, the ground material over 1000 ton/hour has to be conveyed with air flow.

One problem to be solved in the conventional vertical roller mill 1 of FIG. 24 resides in narrow particle-size distribution of the products obtained through the pipe line 10. Particularly, regarding the operation for grinding the cement clinkers, the particle size distribution of the products has a great influence on the quality of products. In the above-mentioned prior art, when the particle-size distribution varies due to the aged deterioration etc., it is difficult to adjust the particle-size to distribution properly.

Since the conventional vertical roller mill 1 of FIG. 24 has a small production ratio of the fine powder, the resultant products have a great deal of intermediate particles in comparison with the product obtained by a tube mill. Thus, there exists such a tendency that (n) value of Rosin-Rammler diagram is large, thereby producing the products characterized by a narrow particle-size distribution. The cement products having a narrow particle-size distribution causes the quantity of water required for the standard softness, the concrete experiment etc. to be increased, so that the quality of cement products would be deteriorated.

The other problem of the vertical roller mill of FIG. 24 resides in largeness of air-swept, that is, the power consumption of suction fan for air flow conveyance is too large. As mentioned above, in order to convey the ground material to the separator 6 inside the housing 2 and subsequently classify the material therein, the material ground between the table 3 and the rollers 5 has to be blown up by a great flow of air introduced from the underside of the table 3 through the clearance 8. Therefore, the pressure loss within the vertical roller mill 1 is relatively large, and further the power consumption of the suction fan is also very large.

The other problem of the vertical roller mill 1 of FIG. 24 resides in lowered temperature of the products. The vertical roller mill 1 is constructed in a manner that a large amount of cool air is introduced for air flow conveyance of the ground material. Therefore, because of the progressed cooling performance, the temperature of the ground material is lowered. It is noted that, together with the cement clinkers, gypsum is also contained in the material to be ground. By lowering the temperature, this gypsum becomes to be the cement products as it is dihydrate gypsum. Generally, it is desirable that the crystallization water of gypsum is transformed into either hemihydrate gypsum or anhydrate gypsum during the grinding process. As a result, a problem arises in that there exists a possibility of false cement setting due to the dihydrate gypsum. Therefore, in order to prevent the false cement setting, an installation for either introducing hot air from the outside or circulating exhaust gas from the suction fan would be required. In such a case, the installation cost would be increased with an increased capital investment.

SUMMARY OF THE INVENTION

Accordingly, it is therefore an object of the present invention to provide a cement clinker grinding method by use of a vertical roller mill and a cement clinker grinding apparatus including the vertical roller mill, both of which are capable of miniaturizing the size of an installation including the vertical roller mill; improving the quality of products by broadening the conventional particle-size distribution of the products, thereby realizing the particle-size distribution suitable for the cement products and reducing the power required for the suction fan and solving the problem of false cement setting.

The object of the present invention described above can be accomplished by a method of grinding cement clinkers by use of a cement clinker grinding apparatus; the method comprising the steps of:

preparing the cement clinker grinding apparatus comprising:
  a vertical roller mill having a table for rotating about a vertical axis and a plurality of rollers arranged on the table at circumferential intervals in a rotating direction of the table, the vertical roller mill being constructed in a manner that feed material to be ground is supplied on a central area of the table, subsequently ground the feed material between the table and the rollers for producing ground material and thereafter, substantially all of the ground material is taken out from an underside of the table;
  a separator for classifying the ground material ground by the vertical roller mill; and
  mechanical conveyer means for conveying at least a part of the ground material taken out of the vertical roller mill to the separator mechanically;

grinding the feed material by pressing force of each of the rollers onto the table, the pressing force being selected so that a roller pressure per full sectional area of the roller ranges from 10 to 15 kg/cm².

According to the present invention, substantially all of the ground material, which has been ground by the vertical roller mill, is taken out from the underside of the table and subsequently conveyed by the mechanical conveyor means which does not utilize pneumatic force, such as a bucket elevator, a screw conveyor, a chain conveyor etc. Then, at least a part of the ground material is fed to the separator, so that the coarse powder obtained in the separator is returned to the vertical roller mill for circulation. The separator is disposed outside of the vertical roller mill. The separator may be an air-flow type of separator utilizing pneumatic force. Alternatively, either a separator having a sieve or the other may be adopted as the separator.

Therefore, according to the invention, since the pressure loss at the mill is remarkably reduced as compared with the above-mentioned prior art mill, it is possible to decrease the power consumption of the vertical roller mill.

Further, owing to the freedom in choice of forms of the separator, if a cyclone separator is used for circulating air supplied to separating means and a cyclone, then it would be unnecessary to take in a great deal of cool air for classification. Consequently, it is also possible to prevent the temperature of the ground material from lowering excessively and therefore, there is no problem of the above-mentioned false cement setting due to the dihydrate gypsum. Again, the installation can be simplified.

Since the ground material is transported to the separator by the bucket elevator, the pressure loss can be reduced thereby to decrease a power required for the fan. Again as it is possible to select the forms of the separator freely, the problem of the grinding temperature can be solved. That is, with the use of the cyclone separator for air circulation with no need of taking in the cool air, the temperature can be maintained high. In this regard, it is noted that there is a case that the products have to be cooled, too.

Particularly according to the invention, it is important to select the roller pressure per full sectional area of roller in the range of 10 to 15 kg/cm². Owing to the selection, it is possible to reduce a ratio of specific grinding-power consumption in the vertical roller mill. In this specification, the ratio of specific grinding-power consumption represents a value of power consumption of the motor driving the vertical roller mill per unit weight of the material to be ground (kwh/t). Note, the unit weight of the material is equivalent to a grinding power consumption as a predetermined standard. In the present invention, since the above roller pressure has a great influence on the grinding efficiency of the apparatus, it is important to select the roller pressure in the above-mentioned range.

When the roller pressure is less than 10 kg/cm², the ratio of specific grinding-power consumption is deteriorated to increase the power consumption. In addition, the (n) value of the Rosin-Rammler is increased, so that the particle-size distribution of the products composed of the fine powder supplied from the separator the becomes narrower. Consequently, with an increased quantity of water required for the standard consistency (the standard consistency water quantity) and an increased unit water quantity at the concrete test, the workability is deteriorated.

When the roller pressure exceeds 15 kg/cm², the ratio of specific grinding-power consumption is also deteriorated. In case of such a roller pressure, the more energy which does not contribute to the grinding is increased, the more the grinding efficiency is lowered. Further, in such a case, it is required to enlarge the strength of the vertical roller mill, thereby being disadvantageous in cost. Again, with the reduction of (n) value, the compressive strength at the concrete test is also lowered. From these points of view, it is preferable that the above roller pressure ranges 11 to 14 kg/cm².

If the roller pressure less than about 8 kg/cm² is selected as that of the separator built-in type roller mill of FIG. 24, it is required to reduce a practical grinding area substantially in order to grind the feed material supplied to a center of the table so fine as a desired particle diameter by one grinding process carried out by the table and the rollers. For this, it is necessary to thin a layer thickness of the material on the table. In this case, the installation must be large-sized roller mill in order to obtain the required quantity of the ground material for a unit time, so that it is disadvantageous economically. In order to solve such a problem, the present invention adopts the above roller pressure which is quite different from that in the prior art of FIG. 24 so that the ratio of specific grinding-power consumption can be lowered and the quality of cement products can be improved.

Further, the present invention is characterized in that a flowing amount of the ground material to be returned to the vertical roller mill is established to range from 100 to 300 per cent (%) of a flowing amount of feed material which is newly thrown into the vertical roller mill.

In connection, an amount of the material charged into the vertical roller mill is equal to that of the ground material as the products discharged from the separator.

According to the invention, owing to the establishment of circulation ratio of the ground material (i.e. a ratio of circulation amount (ton/hour) of the ground material returned to the vertical roller mill to a charging amount of the feed material newly charged into the mill) in the range of 100 to 300%, it is possible to realize a fine ratio of specific grinding-power consumption and an appropriate (n) value as the cement products. On the contrary, in case of the circulation ratio less than 100%, a material layer of sufficient thickness is not formed on the table, so that the vibrations, the noise and the ratio of specific grinding-power consumption are respectively increased while the grinding efficiency is lowered. Further, with an excessive smallness in (n) value, in other words, since the particle-size distribution of the ground material as the products becomes to be too broad, a strength of the concrete for compression is lowered.

While, when the circulation ratio is more than 300%, a difference between a thickness of the material on the table before being crushed and a thickness of the ground material on the table after being crushed by the roller, is increased. Consequently, the loss of energy, the energy component not-contributing to the grinding, that is, the rolling resistance of the rollers, the vibrations, the noise etc. are respectively increased while the grinding efficiency is lowered to make a stable operation difficult. Further, with an excessive largess in (n) value, the particle-size distribution of the ground material as the products is narrow.

There is a close relationship between the roller pressure per full sectional area of the roller and the circulation ratio. The higher in the range of 10 to 15 kg/cm² the roller pressure is established, the lower the ratio of specific grinding-power consumption becomes and the circulation ratio for realizing an appropriate (n) value becomes in the range of 100 to 300%, too. This means that to increase the roller pressure for purpose of making the finer particle size of the ground material after one time grinding operation between the table and the rollers, meets with good results and conversely, to grind the material repeatedly while lowering the roller pressure and heightening the circulation ratio incurs bad results with the high ratio of specific grinding-power consumption.

Further, the present invention is characterized by adding liquid only in a frictional grinding zone where the feed material is ground between the table and the rollers and in just front of the rollers on respective upstream sides thereof in the rotating direction of the table, the frictional grinding zone being positioned outside a position where a relative speed between the table and each of the rollers is equal to zero, in the radial direction of the table.

In connection, the present invention is further characterized in that the liquid is 0.5 to 3% of the feed material to be ground.

With the above-mentioned adding of the liquid of 0.5 to 3% of the feed material to be ground, it is possible to reduce the vibrations of the vertical roller mill, thereby accomplishing the stable operation and improving the grinding efficiency remarkably. In addition, it is possible to improve the narrow particle-size distribution to be solved in the vertical roller mill for grinding the cement clinkers, whereby the products quality can be improved.

According to the invention, with the above-mentioned adding of the liquid only in the frictional grinding zone, the grinding operation of the vertical roller mill can be stabilized under the low circulation ratio in comparison with the prior art of FIG. 24 and furthermore, it is possible to improve the grinding efficiency and the products quality.

In the frictional grinding zone, frictional grinding is carried out since a difference between the circumferential velocity of the table and that of the outer periphery of the roller is large. For the stable grinding operation in the frictional grinding zone, it is important that the grinding operation executed by the table and the rollers is always maintained under the same grinding condition and a consolidated material layer is stably produced due to the pressure of the grinding rollers. Additionally, in order to produce the high quality products with the improvements in grinding efficiency and production ratio of the fine power, it is important that, as effective grinding pressure, the pressure of the rollers acts on the material to be ground in the frictional grinding zone effectively. For this, there must exist sufficient material to be ground in the frictional grinding zone.

According to the invention, substantially all of the ground material of the vertical roller mill is once discharged to the outside and subsequently classified by the separator outside the vertical roller mill. The resultant coarse powder is then supplied to a center area of the table through a material chute, together with the new material to be ground. Next, the material on the center of the table is dispersed radially outward of the table by centrifugal force due to the rotating table and thereafter, it is ground again by the rollers.

Defined radially inward of the grinding zone is a compressive grinding zone where the above difference of circumferential velocity between the table and the outer peripheries of the rollers, i.e. a relative slip therebetween, is small.

It is noted that, in the vertical roller mill of the invention, there is no difference in the quantity of the ground material on the table in between the compressive grinding zone and the frictional grinding zone. Therefore, as it approaches outward in the radial direction of the table, a dispersing area of the table is gradually increased and a layer thickness of the material is gradually decreased due to the increased dispersing velocity of particles. Thus, the vertical roller mill of the invention has a tendency that a grinding layer is formed only in the compressive grinding zone while the material layer of a sufficient thickness is not formed in the frictional grinding zone. In such a case, great vibrations are occurred in the vertical roller mill, thereby causing the unstable operation. Particularly, in such a constitution that the circulation ratio is selected to be less than 300% in accordance with the invention, it is considerably difficult to maintain the stable operation since the absolute quantity itself of the material on the table is remarkably decreased as compared with that of the prior art mill of FIG. 24.

Therefore, according to the invention, the liquid is added to the material only in the frictional grinding zone on the table. Accordingly, even when the layer thickness of the material in the frictional grinding zone is small as the present invention, it is possible to improve the biting performance of the material against the rollers remarkably. In other words, it is possible to press the material in the frictional grinding zone between the table and the rollers, whereby the grinding pressure by the rollers can be used as the effective grinding force. Consequently, it is possible to restrict the vibrations of the vertical roller mill effectively while maintaining the stable operation, even though the circulation ratio is less than 300%.

Moreover, according to the present invention, since it is possible to grind the material in the frictional grinding zone under sufficient grinding pressure, the apparatus' capability of producing the fine powder can be remarkably improved. Thus, the desirable particle constitution of the cement products of high quality can be completed to bring an ability of a grinding system to which the present invention is applied, into full play.

According to the experiments of the inventors, it is found that when the liquid is added only in the compressive grinding zone, violent vibrations are produced because the material hardened by the liquid sticks on the outer surfaces of the rollers unstable. In addition, it is found that when adding the liquid to not only the frictional grinding zone but the compressive grinding zone, the violent vibrations are caused similarly. Further, according to the experiments of the inventors, even when the liquid is previously added to the ground material supplied to the center of the table, the violent vibrations are generated.

From these experimental results, it is found that the liquid should be supplied only to the frictional grinding zone in order to reduce the vibrations. Further, it is preferable that the liquid has been added just before grinding the material by the rollers and the table in such a manner that, before the liquid is involved by the rollers, the added liquid is not vaporized by the material's heat.

The liquid is selected so as to range from 0.5 to 3% of a weight of the material to be ground. In case of exceeding 3%, there is a possibility of causing the chemical reaction of cement clinkers for "false setting" thereof. While, under 0.5% of the liquid, the reduction in vibrations would not be effected. It is preferable to select the liquid ranging from approx. 1 to 2% of the material to be ground.

As to the liquid, it may be water alone, for example. Alternatively, it may be a mixture of water and grinding aid, such as diethylene glycol. Then, the diethylene glycol is mixed in the weight ratio of 1/100 to 1/10 of the water.

Hereat, in the prior art vertical roller mill of FIG. 24, the liquid for preventing the vibrations is added into the feed material charged into the material chute 7 (see e.g. Japanese Patent Publication No. 63-159241, Japanese Examined Patent Publication No. 7-64603). In the operation of the vertical roller mill of FIG. 24, all of the ground material flying from the outer periphery of the table 3 is not conveyed to the separator 6. Although it is described that the velocity of air flowing through the clearance 8 is more than 30 m/s, the velocity will be decreased to several m/s in the vicinity of an upside of the clearance 8. Therefore, due to the reduction in velocity, coarse particles contained in the flying ground material successively fall on the table 3 without being conveyed to the separator 6 and thereafter, the particles are ground by the rollers 5 again.

Therefore, in the prior art shown in FIG. 24, there exists a great deal of coarse particles in the vicinity of the outer periphery of the table 3 rather than the center of the table 3. That is, a lot of ground material exists in the frictional grinding zone, as compared with the compressive grinding zone. Accordingly, as a matter of course, a quantity of the material in the frictional grinding zone is larger than that in the compressive grinding zone. Thus, sufficient quantity of the material is engaged between the table 3 and the rollers 5 in the frictional grinding zone, different from the quantity in the compressive grinding zone. Consequently, in the prior art, the vibrations of the vertical roller mill can be effectively reduced by previous adding the liquid into the material supplied to the material chute 7.

On the contrary, compared with the layer thickness of the material in the frictional grinding zone of the conventional roller mill, the layer thickness of the material in the frictional grinding zone of the present vertical roller mill is considerably small since the circulation ratio of the invention is smaller than that of the prior art mill and the quantity of material existing in the compressive grinding zone is equal to that in the frictional grinding zone. Therefore, even if the prior art where the liquid is previously added into the feed material supplied into the material chute 7 is simply applied to the present invention, it is impossible to restrict the vibrations of the vertical roller mill of the invention. Under such a situation, the present invention is provided to solve the above problem in the afore-mentioned way.

According to the present invention, there is also provided a cement clinker grinding apparatus comprising:

a vertical roller mill having a table for rotating about a vertical axis and a plurality of rollers arranged on the table at circumferential intervals in a rotating direction of the table, the vertical roller mill being constructed in a manner that feed material to be ground is supplied on a central area of the table, subsequently ground the feed material between the table and the rollers for producing ground material and thereafter, all the ground material is substantially taken out from an underside of the table;

a separator for classifying the ground material ground by the vertical roller mill; and mechanical conveyor means for conveying at least a part of the ground material taken out of the vertical roller mill to the separator mechanically;

wherein a pressing force of each of the rollers onto the table is selected so that a roller pressure of the pressing force per full sectional area of the roller ranges from 10 to 15 kg/cm$^2$.

In the present invention, the cement clinker grinding apparatus is characterized in that a flowing amount of the ground material to be returned to the vertical roller mill is established to range from 100 to 300 per cent (%) of a flowing amount of feed material which is newly thrown into the vertical roller mill.

Further, the cement clinker grinding apparatus of the present invention is characterized by further comprising a plurality of nozzles each of which is arranged in just front of the roller on respective upstream side thereof in the rotating direction of the table, for ejecting liquid of 0.5 to 3% of the feed material to be ground only in a grinding zone where the feed material is ground between the table and the rollers, the grinding zone being positioned outside a position where a relative speed between the table and each of the rollers is equal to zero, in the radial direction of the table.

According to the invention, it is possible to miniaturize the installation and improve the quality of the cement clinkers. In addition, it is possible to reduce the power for the fan and prevent the occurrence of false cement setting due to the dihydrate gypsum. Therefore, the installation can be further simplified, as mentioned before.

Furthermore, the present invention is characterized in that each of the nozzles is provided with a nozzle hole through which the liquid is ejected in a flattened form extending in the radial direction of the table.

In detail, the liquid is ejected in a flattened and fan-shaped pattern extending in the radial direction of the table. Therefore, it is possible to sprinkle the liquid in the grinding zone uniformly, in spite of a small number of nozzles.

Furthermore, in the present invention, the mechanical conveyor means is characterized by conveying all of the ground material, which has been taken out of the vertical roller mill, to the separator.

Further, the mechanical conveyor means is characterized by further comprising distributing means for conveying a part of the ground material conveyed by the mechanical conveyor means to the separator while returning a remaining part of the ground material to the vertical roller mill directly. In this case, since the products discharged from the separator contains the fine powder of which particle size is relatively small, the particle-size distribution of the products can be broaden to improve the quality of the cement products.

The above and other features and advantages of this invention will become apparent, and the invention itself will best be understood, from a study of the following description and appended claims, with reference had to the attached drawings showing some preferred embodiments of the invention.

BRIEF DESCRIPTION OF THE DRAWINGS

FIG. 2 is a vertical cross-sectional view of a vertical roller mill of the cement clinker grinding apparatus of the embodiment;

FIG. 3 is a horizontal cross-sectional view showing a table and rollers of the vertical roller mill of FIG. 2;

FIGS. 4A and 4B are simplified cross-sectional views showing rollers crushing and grinding materials on the table, in which FIG. 4A shows a condition of high circulation rate and FIG. 4B shows a condition of low circulation rate;

FIG. 10 is a diagram showing a relationship between (n) value of Rosin-Rammler diagram and compressive strength of concrete, in accordance with experimental results of the inventors;

FIG. 11 is a diagram showing a relationship between (n) value of Rosin-Rammler diagram and unit water quantity at a concrete test, in accordance with experimental results of the inventors;

FIG. 12 is a diagram showing a relationship between circulation ratio for the ground material and ratio of specific grinding-power consumption, in accordance with experimental results of the inventors;

FIG. 13 is a diagram showing a relationship between circulation ratio for the ground material and (n) value of Rosin-Rammler diagram, in accordance with experimental results of the inventors;

FIGS. 18A and 18B are diagrams for explanation of grinding operation carried out by the table and the roller of the vertical roller mill of the embodiment, in which FIG. 18A is a vertical cross sectional view of the table and FIG. 18B is an explanatory diagram of the grinding operation;

FIG. 21 is a vertical cross-sectional view of a separator of FIGS. 1 and 20;

FIG. 22 is a horizontal cross-sectional view of the separator, taken along a line XXII—XXII of FIG. 21.

FIG. 23 is a horizontal cross-sectional view of the separator, showing a dispersing plate and impeller vanes of FIG. 21;

DESCRIPTION OF THE PREFERRED EMBODIMENT

Figure 1:
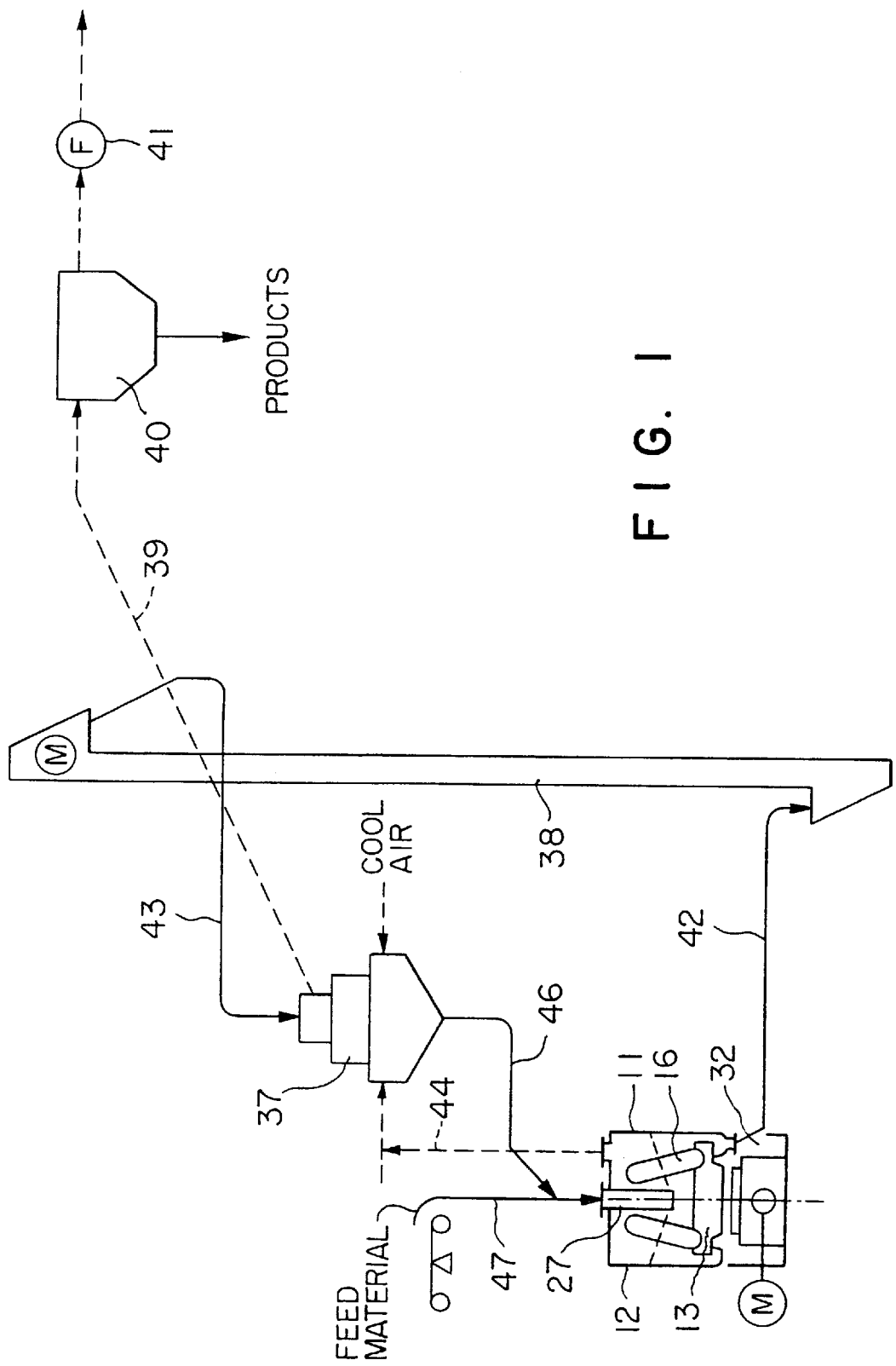
FIG. 1 is a systematic view showing the whole constitution of a cement clinker grinding apparatus in accordance with an embodiment of the present invention.

FIG. 1 is a block diagram showing the whole constitution of the cement clinker grinding apparatus in accordance with an embodiment of the present invention.

Basically, the cement clinker grinding apparatus includes a vertical roller mill 11, a separator 37 for returning classified coarse powder to the vertical roller mill 11 for circulation, and a bucket elevator 38 as mechanical conveying means for conveying the ground material, which has been taken out of the vertical roller mill, to the separator 37. Fine powder classified by the separator 37 is convey,ed through a pipe line 39 with air flow and then collected by a bag filter 40 to be products. A suction fan 41 is connected to the bag filter 40. Together with the ground material in a pipe line 47, the coarse powder, which has been classified by the separator 37 and subsequently conveyed through a pipe line 46, is returned to the vertical roller mill 11 through a feed material chute 27 for circulation.

FIG. 2 is a simplified cross sectional view of the vertical roller mill 11 of FIG. 1. The vertical roller mill 11 includes a generally right cylindrical housing 12. Inside the housing 12, a table 13 is arranged along a vertical axis 33 thereof. The table 13 is driven for rotation by a motor 15 through a reduction unit 14 disposed under the table 13.

On the table 13, a plurality of rollers 16 are arranged on a grinding orbital diameter D Ø at circumferential intervals. Each roller 16 is pivotal supported by an arm 17, having a rotational axis extending in the radial direction of the table 13. The arm 17 is mounted on a column 19 in a fixed position through a bearing support 18 having a horizontal axis. As shown with an imaginary two-clot line 20, both of the roller 16 and the arm 17 are adapted so as to withdraw about the bearing support 18, thereby allowing of the maintenance and inspection.

The arm 17 is linked with a piston rod 22 of a hydraulic cylinder 21 constituting a pressurized unit through the intermediary of a pin 23. The cylinder 21 is linked with a bracket 26 mounted in a fixed position by means of a clevis pin 24. A shrinkage of the piston rod 22 of the cylinder 21 allows the roller 16 to be pressed on the table 13 for pressure contact.

In the housing 12, the feed material chute 27 is provided with an axis identical to the vertical axis 33 of the table 13. Into the feed material chute 27, feed material to be ground, such as the cement clinkers and the cement materials etc., is charged as shown with an arrow 28. From the bottom of the feed material chute 27, the feed material to be ground is dropped on a center part of the table 13.

The feed material supplied on the center of the table 13 is caught between the rollers 16 arranged on the grinding orbital diameter D Ø and the table 13 and then ground therebetween in a grinding area Z on the grinding orbit.

Substantially, all the ground material is moved outward in the radial direction of the table 13 and subsequently dropped on an annular endless cradle 29 below the table 13 via a clearance defined between the periphery of the table 13 and the inner face of the housing 12. The ground material on the cradle 29 is then moved in the circumferential direction by scrapers 30 secured on the table 13, so that the material is collected from an outlet chute 32 through an exhaust port 31 of the cradle 29. The ground material in the outlet chute 32 is introduced into the bucket elevator 38 through a pipe line 42. Then, the ground material elevated by the bucket elevator 38 is supplied into the separator 37 through a pipe line 43.

Connected to an upper part of the housing 12 of the vertical roller mill 11 is a pipe line 44 which communicates with the separator 37 to prevent the rising of dust from the housing 12.

FIG. 3 is a simplified horizontal cross-sectional view of the vertical roller mill 11, viewed from a portion above the rollers 16. In this embodiment, three rollers 16 are arranged at regular intervals in the circumferential direction of the housing 12. Note, a rotating direction of the table 13 is shown with an arrow 45.

According to the invention, for purposes of reduction in vibrations of the apparatus for its stable grinding, operation, remarkable improvement of grinding efficiency and improvement of narrow grading of the cement clinker products for the improved quality of products, three nozzles 59 for sprinkling liquid are respectively arranged just ahead of the rollers 16 on the upstream side of the rotating direction 45 of the table 13, as shown in FIG. 3. Owing to these nozzles 59, the liquid is supplied only into a grinding area 72, as described later.

The liquid is selected so as to range from 0.5 to 3 per cent (%) of a weight of the feed material. In case of exceeding 3%, there is a possibility of causing the chemical reaction of cement clinkers for "false setting" thereof. While, under 0.5% of the liquid, the reduction in vibrations would not be effected. It is preferable to select the liquid ranging from approx. 1 to 2% of the ground material.

As to the liquid, it may be water alone, for example. Alternatively, it may be a mixture of water and grinding aid, such as diethylenie glycol. Then, the diethylene glycol is mixed with the water in the weight ratio of 1/100 to 1/10 of the water.

FIGS. 4A and 4B are simplified and circumferentially unfolded side views showing a condition that a material layer 48 to be ground is being ground on the table 13. As shown with an arrow 49, a compressive force is applied on the roller 16 by the hydraulic cylinder 21. In the figures, FIG. 4A shows a condition of high circulation rate where the flow rate of coarse powder supplied from the separator 47 to the vertical roller mill 11 is large. FIG. 4B shows a condition of low circulation rate where the flow rate of coarse powder is small in accordance with the invention. With the rotation of the table 13 in the direction of an arrow 45, the roller 16 is rotated as shown with an arrow 50. In case of high circulation rate of FIG. 4A, a thickness d1 of the material layer 48 is large in comparison with a small thickness d2 of the layer after being ground, so that a difference between both thickness (=d1−d2) is large.

On the contrary, under condition of low circulation rate of FIG. 4B, a thickness d3 of the material layer 48 to be ground is less than the thickness d1 (d3<d1), so that a difference (=d3−d4) between the thickness d3 and a thickness d4 alter being ground is small. Further, since the compressive force of the roller 16 acts on the material layer 48 under the condition of FIG. 4A effectively, a maximum Pmax1 of the force is less than a maximum Pmax2 of the compressive force in case of low circulation rate of FIG. 4B (Pmax1<Pmax2). Therefore, under such a condition of high circulation rate of FIG. 4A, the loss in energy increases. Thus, energy component contributing to the grinding operation ineffectively, in other words, the rolling resistance of the roller 16, vibrations and noise etc. are increased, so that the grinding efficiency is lowered. In this view, it will be understood that to grind the material repeatedly while increasing the circulation rate by lowering the pressure of the roller 16 causes the ratio of specific grinding-power consumption to be increased, thereby causing an undesirable result. Therefore, according to the invention, the roller pressure is increased in order to further fine the particle diameter of the material after the first grinding operation.

Figure 5:
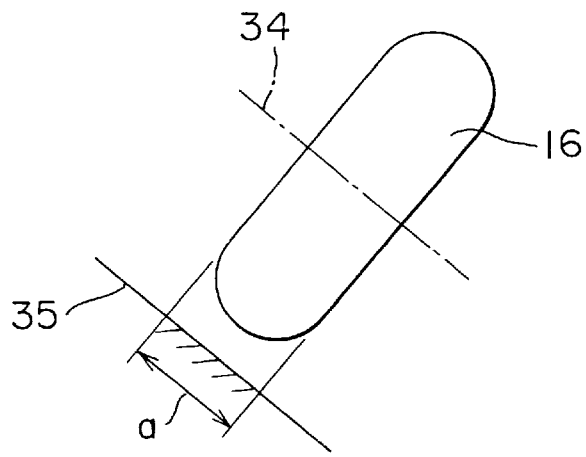
FIG. 5 is a front view showing a condition of the roller.
Figure 6:
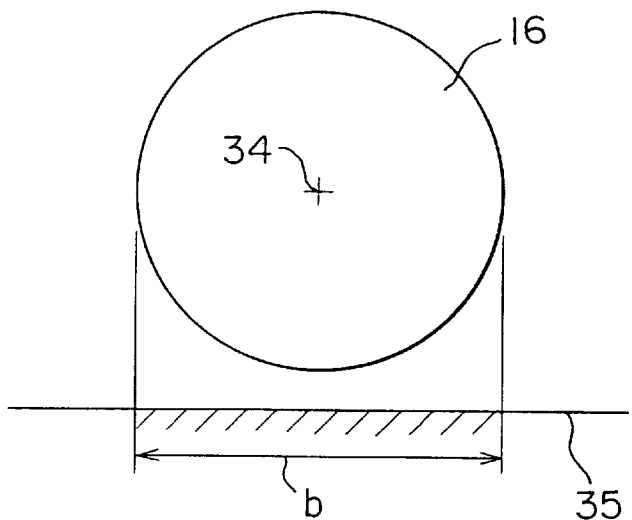
FIG. 6 is a side view of FIG. 5.
Figure 7:
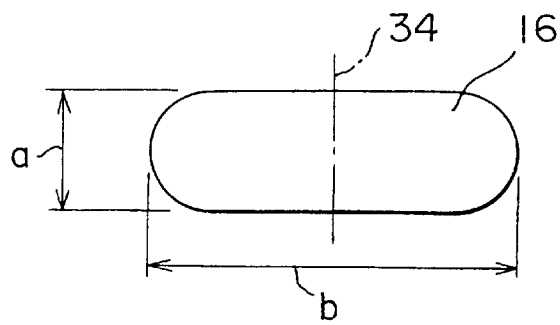
FIG. 7 is a plan view of FIG. 5.

FIG. 5 is a side view of the roller 16, FIG. 6 a front view of the roller 16 and FIG. 7 a plan view of the roller. In the figures, reference numeral 34 denotes a rotational axis of the roller 16. Providing that a full sectional area of the roller 16 onto a plane 35 parallel with the axis 34 is represented by the alphabet S, the area S call be generally calculated by the following expression:

$$S = a \times b$$

where a is a width of the roller 16; and
b is a diameter of the roller 16.

According to the invention, the roller pressure of the compressive force of the roller 16 per full sectional area S is selected from 10 to 15 kg/cm², for example.

Figure 8:
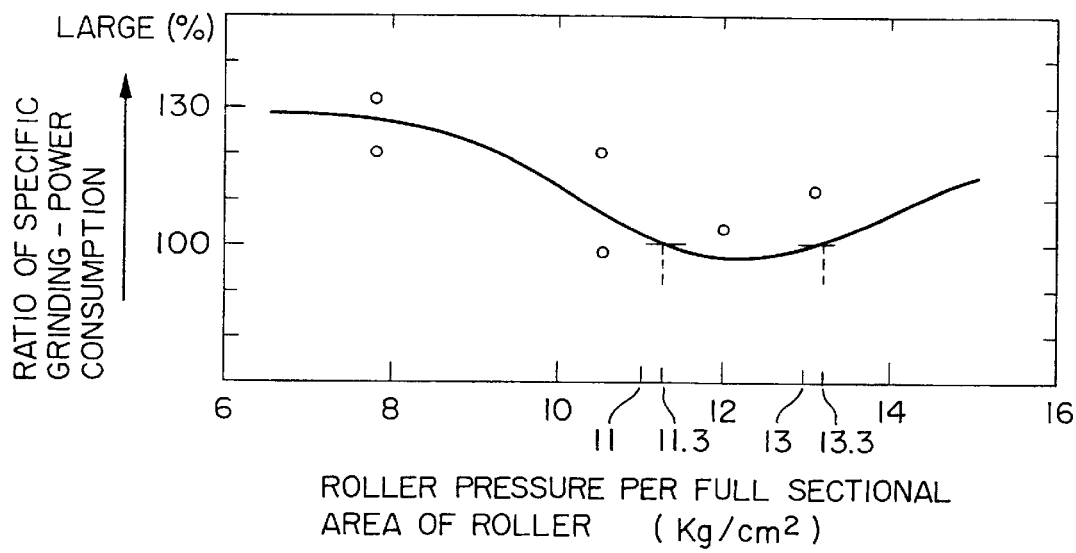
FIG. 8 is a diagram showing a relationship between roller pressure per full sectional area of the roller and ratio of specific grinding-power consumption, in accordance with experimental results of the inventors.

FIG. 8 is a graph showing an experimental result obtained by the inventors of the present application. Note, in the structures shown in FIGS. 1 to 7, the material thrown into the feed material chute 27 is defined to be cement clinkers; the work index Wi expressing the ground property is from 14 to 16 kwh/t; the table 13 and the rollers 16 are made of high-chromium cast iron; the roller 16 has 340 mm (=a) in width and 900 mm (=b) in diameter; the grinding orbital diameter D Ø of the table 13 is 1300 mm; the rotating speed of the table 13 is 45.4 rpm; the particle size of the clinker thrown into the material chute 27 is 25 mm of 80% pass.

From the experimental result of FIG. 8, it will be understood that the ratio of specific grinding-power consumption of the motor 15 is relatively small within a range from 10 to 15 kg/cm², preferably. Under 10 kg/cm² of the roller pressure, the ratio of specific grinding-power consumption of the motor 15 grows larger. Similarly, over 15 kg/cm² of the roller pressure, the ratio of specific grinding-power consumption of the motor 15 gets larger. The preferable range of roller pressure exhibiting a small ratio of specific grinding-powker consumption is from 11 to 14 kg/cm², from 11.3 to 13.3 kg/cm² more preferably and the most preferable roller pressure is 12.2 kg/cm².

Figure 24:
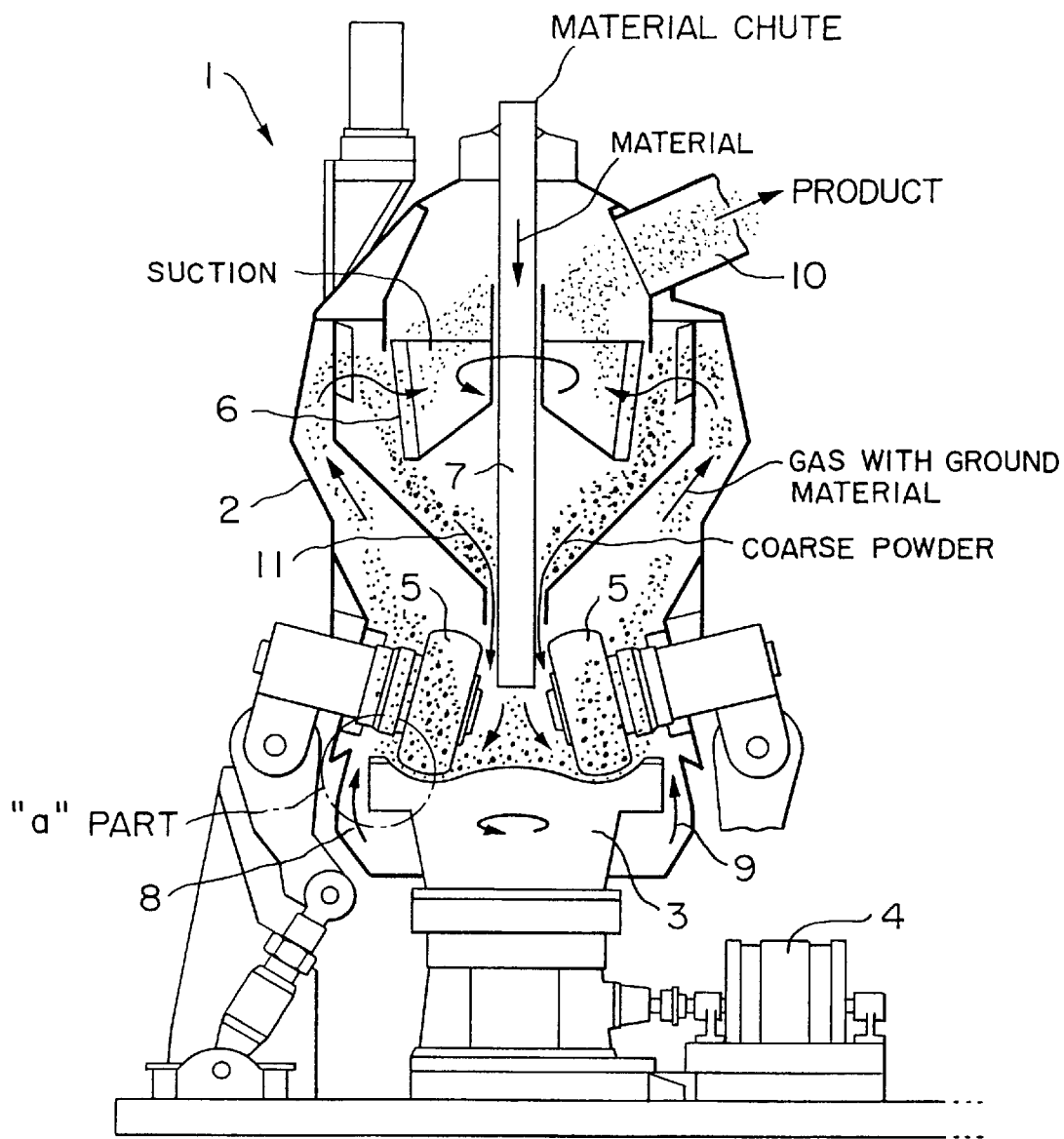
FIG. 24 is a vertical cross-sectional view of a prior art vertical roller mill.

Note, it is found that, in the present structure, the ratio of specific grinding-power consumption remarkably gets worse in the range less than 8 kg/cm² which has been established in the prior art vertical roller mill of FIG. 24.

Figure 9:
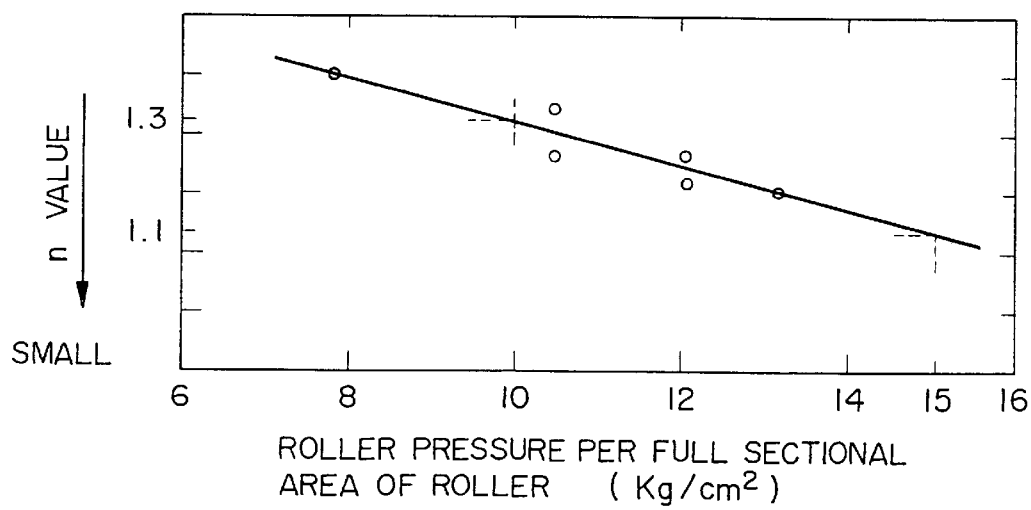
FIG. 9 is a diagram showing a relationship between the roller pressure and (n) value of Rosin-Rammler diagram, in accordance with experimental results of the inventors.

FIG. 9 is a graph showing another experimental result obtained by the present inventors. FIG. 9 shows a relationship between the pressure of the roller 16 per full sectional area of roller 16 and value (n) in the Rosin-Rammler diagram. From the figure, it will be found that the higher the roller pressure gets, the smaller the value (n) gets, in other words, the broader the particle size of the cement products gets, thereby providing a desirable result for the cement products. Further, it is also found that to establish the roller pressure in excess of 15 kg/cm² is ineffective in view that the grinding efficiency is decreased while energy that does not contribute on the grinding is increased, as previously mentioned with reference to FIG. 8. In addition, if selecting the roller pressure in excess of 15 kg/cm², it would be disadvantageous in aspects of cost since it has to increase the strength of the vertical roller mill 11 excessively.

FIG. 10 is a graph of experimental result obtained by the present inventors, showing a relationship between the value (n) in the Rosin-Rammler diagram and the compressive strength of concrete. From the figure, it is preferable to select a value (n) of approx. 1.2 in order to enlarge the concrete strength. Generally, the value (n) is defined in a range from approx. 1.1 to 1.3.

FIG. 11 is a graph of experimental result obtained by the present inventors, showing a relationship between the value (n) in the Rosin-Rammler diagram and an amount of unit water at the concrete test. From the figure, it is found that the above definition of value (n) in the range from approx. 1.1 to 1.3 accomplishes a small amount of the unit water, preferably.

Accordingly, from FIGS. 10 and 11, it is necessary to select the value (n) in the range from approx. 1.1 to 1.3. For this, according to the invention, the roller pressure is selected in the range from 10 to 15 kg/cm², as shown in FIG. 9.

FIG. 12 is a graph of experimental result obtained by the present inventors, showing a relationship between a circulation ratio of the ground material and the ratio of specific grinding-power consumption. In FIG. 12, a line 53 shows the character in case that the above roller pressure is defined in the range from 10 to 15 kg/cm², while a line 54 shows the character in case of the range from 7.8 to 10.5 kg/cm². From this experiment result, it will be understood that to select the circulation ratio from 100 to 300 per cent (%) allows the ratio of specific grinding-power consumption to be reduced.

As will be understood from FIG. 12, the above roller pressure has a close connection with the circulation ratio. By the establishment of roller pressure in the range from 10 to 15 kg/cm², it is possible to lower the specific consumed grinding-power ratio with a low circulation ratio. Note, when the circulation ratio exceeds 300 per cent, it has been difficult to carry, out the stable operation of the apparatus because of its magnified vibration.

From the experiment result shown in FIG. 12, it is found that, with the increased roller pressure, to produce the finer particle diameter of the ground material after the first grinding operation executed between the table and the rollers meets with good results, while to repeatedly grind the ground material with the decreased roller pressure thereby increasing the circulation ratio causes the specific grinding-power consumption to be increased undesirably.

FIG. 13 is a graph of an experimental result obtained by the present inventors, showing a relationship between the circulation ratio and the value (n) in the Rosin-Rammler diagram. In FIG. 13, a line 55 shows the character in case that the above roller pressure is defined in the range from 10 to 15 kg/cm$^2$, while a line 56 shows the character in case of the range from 8 to 10.5 kg/cm$^2$. From the figure, it will be understood that a reduction of the circulation ratio allows n value to be decreased thereby to broaden the particle size of the products, whereby the quality of cement products can be improved. On the contrary, if the roller pressure of 8 kg/cm$^2$ in the prior art described with reference to FIG. 24 is applied to the present invention, the character 56 would be revealed to cause the increased n value and the narrowed particle size distribution, so that the quality of cement products would be deteriorated.

Figure 14:
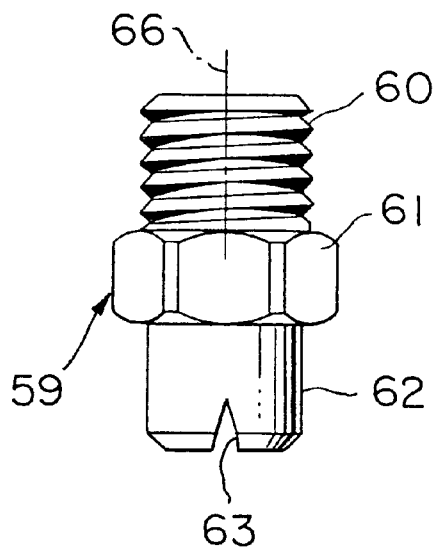
FIG. 14 is a side view of a nozzle as a constituent of the cement clinker grinding apparatus of the embodiment.
Figure 15:
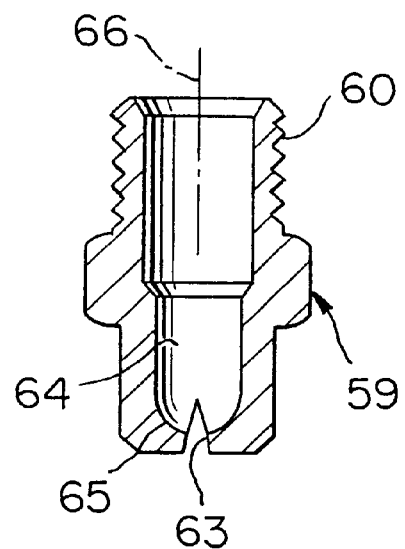
FIG. 15 is a longitudinal cross-sectional view of the nozzle of FIG. 14.
Figure 16:
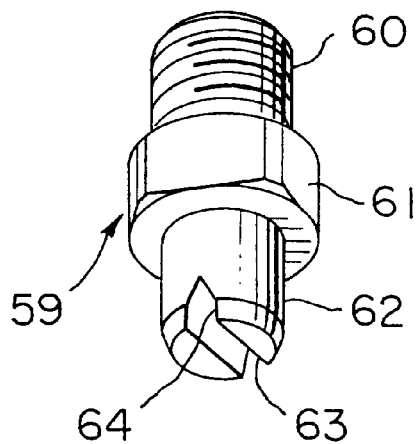
FIG. 16 is a perspective view of the nozzle of FIG. 14.

FIG. 14 is a side view of the nozzle 59, FIG. 15 a longitudinal cross sectional view of the nozzle 59 and FIG. 16 a perspective view of the nozzle 59. The nozzle 59 comprises a tapered screw 60, a wrenched part 61 and a lower part 62 provided with a nozzle hole 63. The tapered screw 60 of the nozzle 59 is screwed into a header 81 (FIG. 3) for feeding liquid. In the modification, the header 81 may be provided with a plurality of nozzles 59. The lower part 62 in the form of a right cylinder has the inverse V-shaped nozzle hole 63 formed so as to extend perpendicular to an axis 66 and diverge downward. The nozzle hole 63 communicates with a generally right-cylindrical liquid supply space 64 formed in the nozzle 59. The space 64 is provided, on a lower part thereof, with a curved portion 56 having a small inner diameter.

The nozzle 59 is symmetrically, formed to right and left of FIG. 15 with respect to a symmetrical plane involving an axis 66 thereof. The symmetrical plane is parallel with a vertical plane involving the rotational axis 34 of the roller 16 and is either identical or parallel with a vertical plane containing the vertical rotating axis 33 of the table 13 and extending in the radial direction.

Figure 17:
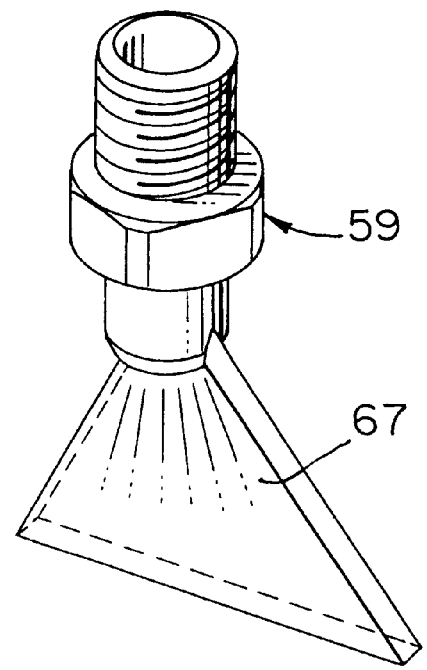
FIG. 17 is a perspective view showing a condition that liquid is ejected from the nozzle of FIG. 14.

FIG. 17 is a perspective view showing a condition that liquid 67 is ejected by the nozzle 59. As shown in the figure, owing to the nozzle hole 63 of the nozzle 59, the liquid 67 is ejected from the nozzle 59 in a flattened fan form. A liquid plane defined by the flattened liquid (mist) 67 extends in the almost radial direction of the table 13 and also coincides with the above symmetrical plane. Further, the liquid plane is either identical or parallel with a vertical plane containing the rotating axis 34 of the roller 16. Owing to the provision of the nozzle 59 constructed above, it is possible to obtain a remarkable effect in spite of a small quantity of sprinkled water.

FIG. 18A is a vertical cross sectional view of the table 13 of the vertical roller mill 11, including the vertical rotational axis 33. An outer peripheral surface 70 of the roller 16 exhibits an arc face about a point on a contact center line 71 as a center. The contact center line 71 is perpendicular to the rotational axis 34 of the roller 16 and is situated in the center of the roller 16 in the axial direction.

The table 13 has a concave surface 72 formed in an arc, corresponding to the outer peripheral surface 70 of the roller 16. Further, the surface 72 is shaped annularly about the rotational axis 33 of the table 13 so that a distance Δd between the outer peripheral surface 70 of the roller 16 and the surface 72 of the table 13 gradually decreases as displacing radially outward of the table 13. The surface 72 is provided, on a radially outer end thereof, with an annular projection 73 which is called "dam ring". The annular projection 73 has a radially inner end 74 formed so as to project to the side of the surface 72, i.e. radially inward of the table 13, providing the so-called overhung configuration.

A grinding zone Z for the material to be ground is defined bar the outer peripheral surface 70 of the roller 16 and the surface 72 of the table 72. The zone Z is composed of a compressive grinding zone Z1 and a frictional grinding zone Z2 arranged radially outward of the zone Z1.

FIG. 18B is an explanatory diagram of the grinding operation carried out by the table 13 and the rollers 16. A line 75 denotes a peripheral speed of the outer surface 70 of the roller 16 about the rotational axis 34 along the radial direction of the table 13. In the figure, the peripheral speed varies convexly upward, in the radial direction of the table 13. A line 76 shows a distribution of rotational speeds of the table 13 in the radial direction, exhibiting a straight line. A synchronous point 77 is an intersection of the lines 75, 76, corresponding to a position where the relative speed between the outer peripheral surface 70 of the roller 16 and the surface 72 of the table 13 becomes zero. On the radial inside of the synchronous point 77, a difference between the peripheral speed of the surface 72 of the table 13 and that of the outer peripheral surface 70 of the roller 16 is relatively small as shown by inclined lines 78. Thus, since a degree of relative slipping therebetween is small, the material to be ground is mainly subjected to the compressive grinding.

On the radial outside of the synchronous point 77, as shown by inclined lines 79, the difference in peripheral speed is larger than that in the compressive grinding zone Z1. Therefore, in this area, the material to be ground is mainly subjected to the grinding operation. According to the concept of the invention, the liquid 67 is ejected from the nozzle 59 only to a sprinkling area 80 in the frictional grinding zone Z2.

In the vertical roller mill 11 of the invention, substantially all the ground material is taken out through a clearance between an outer peripheral surface 82 of the table 13 and an inner surface of the housing 12 downward. Therefore, there is no difference between the compressive grinding zone Z1 and the frictional grinding zone Z2 in terms of the amount of the ground material on the table 13. Thus, in the frictional grinding zone Z2 radially outward of the compressive grinding zone Z1, a layer thickness of the ground material on the table 13 gets thinner than that in the zone Z1. Consequently, the vertical roller mill 11 is subjected to large vibrations in the extremely unstable operation.

According to the invention, the liquid is added from the nozzles 59 in order to solve the above problem. Thus, the thin ground material in the frictional grinding zone Z2 can be pressed between the table 13 and the rollers 16 certainly, whereby it is possible to make the crushing pressure of the rollers 16 act as the crushing power effectively. Therefore, it is possible to restrict the vibrations of the vertical roller mill 11 effectively, so that the stable operation can be maintained. Moreover, as it is possible to grind the material in the frictional grinding zone Z2 under sufficient grinding pressure, the apparatus' capability of producing the fine powder can be remarkably, improved thereby to realize the desirable particle distribution of the cement products of high quality.

According to the experiments of the inventors, it is found that in case of adding the liquid to the compressive grinding zone Z1, large vibrations are generated in the apparatus. In addition, it is found that when the liquid is previously added to the ground material supplied to the center of the table 13, the large vibrations are generated. From such experimental results, in the present invention, the liquid is supplied only to the frictional grinding zone Z2.

According to the experiments, when the liquid was not added into the apparatus of the embodiment shown in FIGS. 1 to 18B, the amplitude of oscillation of the table 13 was 30 to 50 µm. On the contrary, in case of adding the liquid of 1 to 2% of the ground material in accordance with the invention, the amplitude of oscillation is remarkably reduced to be 15 to 30 µm, so that the stable operation can be realized. Furthermore, it is confirmed that, in comparison with the case that the liquid is not added, the electric power efficiency is improved by about 15% thereby to progress the grinding efficiency substantially.

Note, the previously mentioned experimental results shown in FIGS. 8 to 13 correspond to results in case of adding the liquid in accordance with the present invention.

Figure 19:
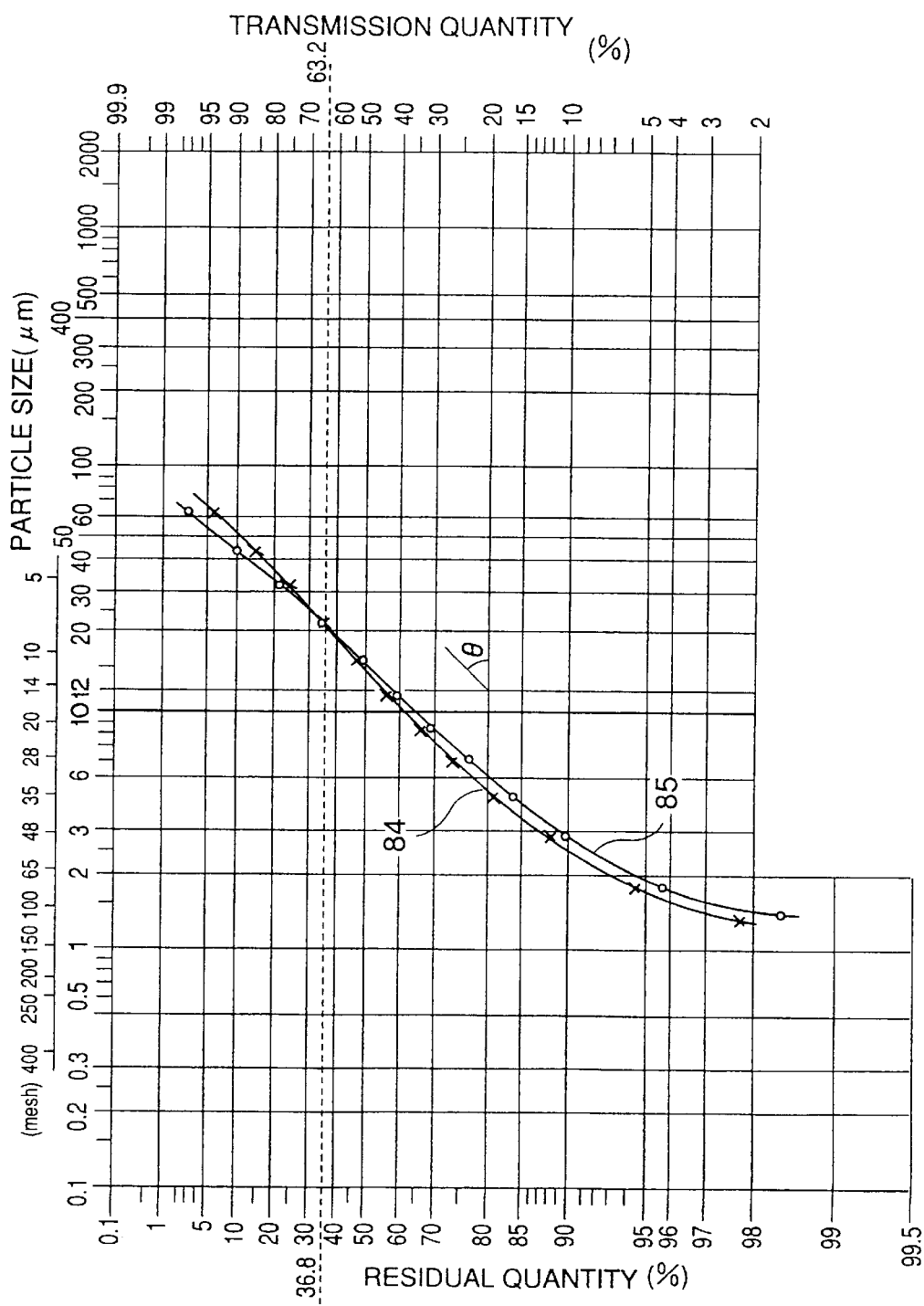
FIG. 19 is a Rosin-Rammler diagram showing an experimental result of the inventors.

FIG. 19 is a Rosin-Rammler diagram showing the experimental results of the inventors. When sprinkling the liquid on the table 13, the resultant characteristic curve of a line 84 has been obtained. While, when the liquid was added, the characteristic curve of a line 85 has been obtained. In the diagram, the horizontal axis designates a particle diameter Dp of the cement products, while the vertical axis designates values of $\log \{\log (100/R(Dp)\}$ where $R(Dp)$ is a particle larger than that of particle diameter Dp, that is, an integrated oversize output, i.e. residual amounts (%). Note, a transmission quantity is represented by an expression $\log \{\log (100-R(Dp)\}$. The shown inclination ($\tan \theta$) in the Rosin-Rammler diagram of FIG. 19 is identical to the above value of n.

In the operation with no liquid, the cement products having a narrow particle-size distribution were obtained with a large value (n) of 1.33, as shown with the line 85. On the contrary, according to the invention, the products having a considerably wide particle-size distribution have been obtained with a small value (n) of 1.16 by adding the liquid. The products of such a wide particle-size distribution are desirable in view that the value (n) is close on (n) values of 1.1 to 1.2 of the products produced by the conventional tube mill.

Figure 20:
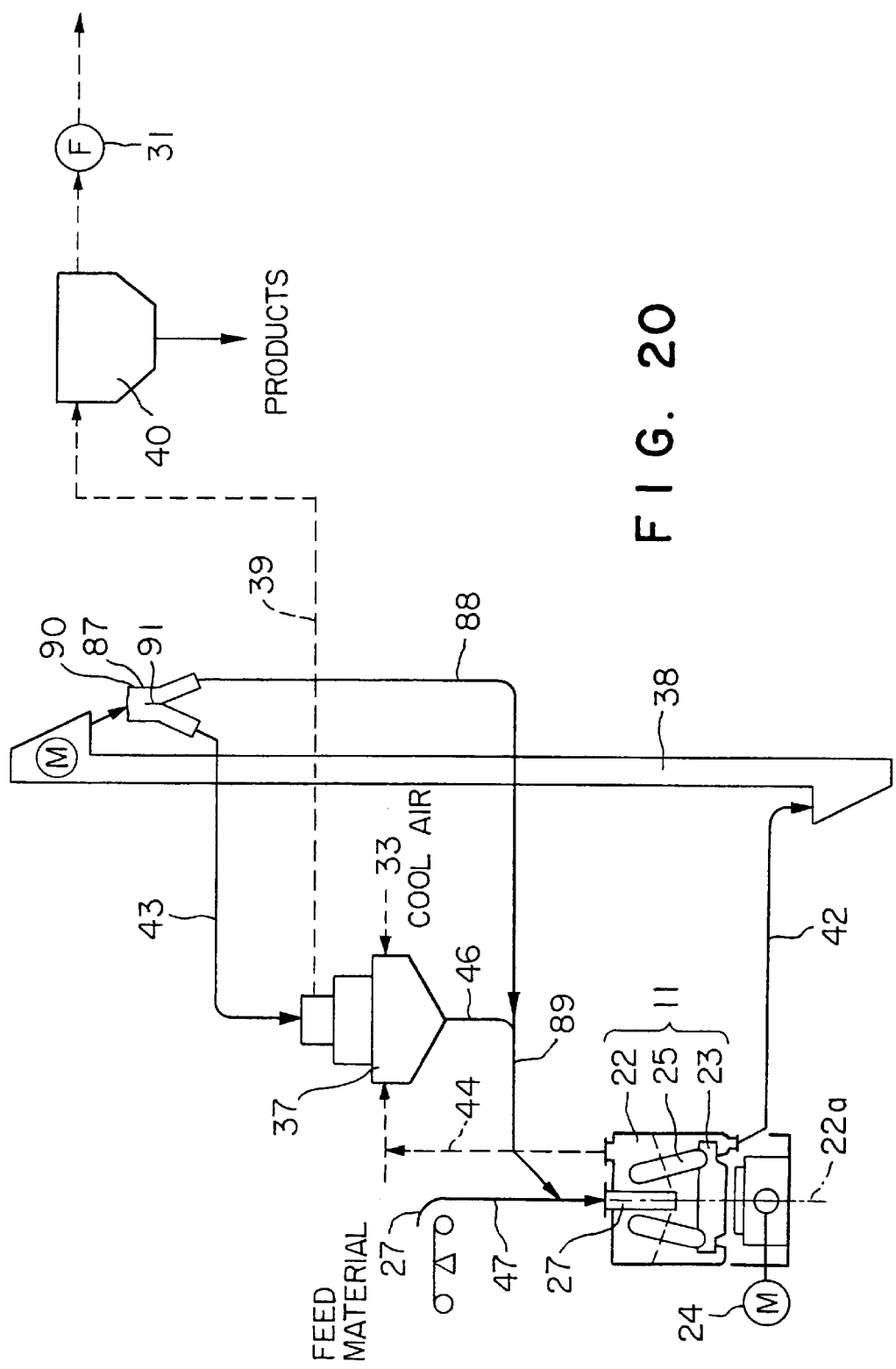
FIG. 20 is a systematic view showing the whole constitution of a cement clinker grinding apparatus in accordance with another embodiment of the present invention.

FIG. 20 is a systematic view showing a whole constitution of the apparatus in accordance with another embodiment of the present invention. According to the embodiment, the ground material (cement clinkers), which has been conveyed by the bucket elevator 38, is partially supplied from a dividing means 87 to the separator 37 through the pipe line 43, while the remaining ground material is introduced into a pipe line 88. The coarse powder fed from the separator 37 into the pipe line 46 and the ground material fed into the pipe line 88 are charged to the material chute 27 of the vertical roller mill 11 of the invention via a pipe line 89 together with new feed material to be ground. According to the above-mentioned structure, since the fine powder having a relatively small particle diameter can be contained in the product discharged from the bag filter 40, it is possible to broad a particle-size distribution of the products, serving an improvement of the quality of cement products.

The flow of the ground material distributed into the pipe line 88 by the dividing means 87 May be about 30% of a flow of the ground material fed to the separator 37 through the pipe line 43. As the dividing means 87, a pipe line 90 introducing the ground material discharged from the bucket elevator 38 is divided into two pipe lines 43, 88 and a damper 91 rotatable about a horizontal axis is disposed at a diverging point of the pipe lines 43, 88, for controlling the respective flows of the ground material. In this waif, it is possible to control the particle-size distribution of the products broader and freer.

FIG. 21 is a cross sectional view of the separator 37 and FIG. 22 is a cross sectional view taken along a line XXII—XXII of FIG. 21. Connected with an upper part of a housing 93 is an outer cylinder 94 which includes a hollow and truncated conical chute 95 arranged therein. The air supplied from the vertical roller mill 11 through the pipe line 44 is introduced into the outer cylinder 94 together with air sucked from the outside. The pipe line 46 is connected with a lower part of the housing 93, for feeding the coarse powder to the vertical roller mill 11. A dispersing plate 96 is disposed under the chute 95. The dispersing plate 96 has impeller vanes 97 fixed thereto at regular intervals in the circumferential direction.

FIG. 23 is a horizontally cross sectional view of the dispersing plate 96 with the impeller vanes 97 of FIG. 21. The dispersing plate 96 is fixed on a lower end of a vertical rotating shaft 98. The shaft 98 is driven for rotation by a motor 99.

The ground material and air from the pipe line 44 is introduced into the outer cylinder 94 from the downside. The ground material is turned and dispersed by the dispersing plates 96 and the vanes 97 together with an air stream. Thus, the ground material is classified due to its centrifugal force and inertia, so that the coarse powder is introduced from a lower part of the housing 93 into the pipe line 46. While, the fine powder flying in the air by the air stream is aerially conveyed to the bag filter 40 through the intermediary of the pipe line 40, so that the product can be completed.

In the modification, the bag filter 40 may be replaced with a cyclone separator.

The constitution in which air is circulated by a cyclone and a fan may be selected as an other embodiment of separator 37. By selecting this constitution, the defects of conventional art as being described above referring to FIG. 24 are eliminated. That is, it is not necessary to provide a great amount of flowing cool air, so that it is no fear that the temperature of the material to be ground become too low. Moreover, there is no fear that dihydrate gypsum remains as cement products, so that it is possible to raise the quality of cement products.

Finally, it will be understood by those skilled in the art that the foregoing description is one of the preferred embodiments of the processing apparatus and processing method, and that various changes and modifications may be made to the present invention without departing from the spirit and scope thereof.

What is claimed is:

1. A method of grinding cement clinkers by use of a cement clinker grinding apparatus, said method comprising:
   supplying feed material to be ground on a central area of a table of a vertical roller mill, said vertical roller mill having said table for rotating about a vertical axis and a plurality of rollers arranged on said table at circumferential intervals in a rotating direction of said table;
   grinding the feed material by pressing force of each of said rollers onto said table, said pressing force being selected so that a roller pressure per full sectional area of said roller is from 10 to 15 kg/cm$^2$;
   removing all the ground material from an underside of said table;

mechanically conveying all of the ground material taken out of said vertical roller mill to a position higher than said vertical roller mill;

separating material suitable for end product that does not need further grinding process from the material mechanically conveyed and;

returning all conveyed material to said vertical roller mill except the separated material as end product.

2. A method of grinding cement clinkers according to claim 1, wherein a flowing amount of the ground material to be returned to said vertical roller mill is established to range from 100 to 300 percent (%) of a flowing amount of feed material which is newly thrown into said vertical roller mill.

3. A method of grinding cement clinkers according to claim 2, further comprising a step of adding liquid only in a frictional grinding zone where the feed material is ground between said table and said roller and in just front of said roller on an upstream side thereof in a rotating direction of said table, said frictional grinding zone being positioned radially outside a compressive grinding zone where a circumferential velocity of the table and a circumferential velocity of the rollers are substantially the same.

4. A method of grinding cement clinkers according to claim 3, wherein said liquid is 0.5 to 3% of the feed material to be ground.

* * * * *